Sept. 12, 1961   R. L. RICHARDSON   2,999,494
PICNIC GRILL
Filed Oct. 27, 1958
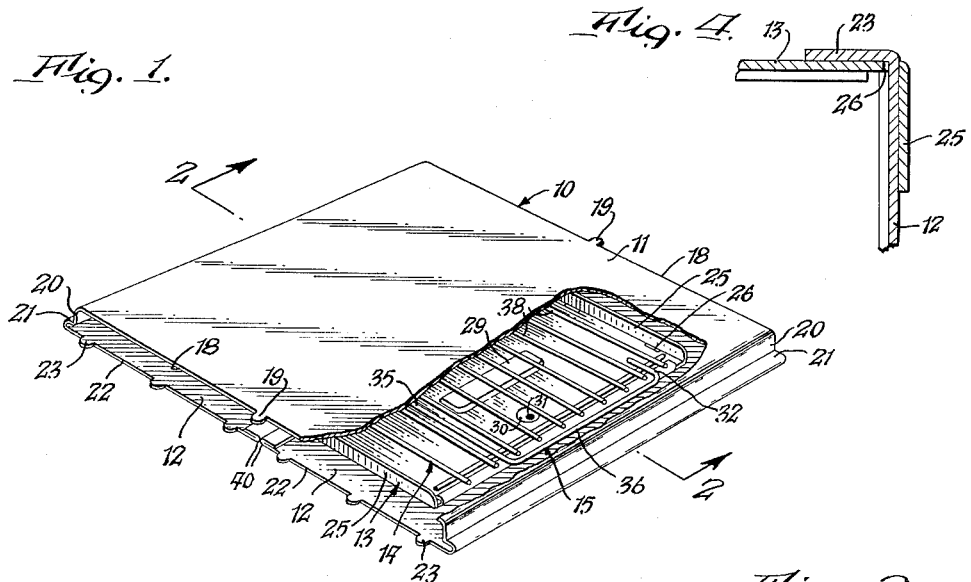
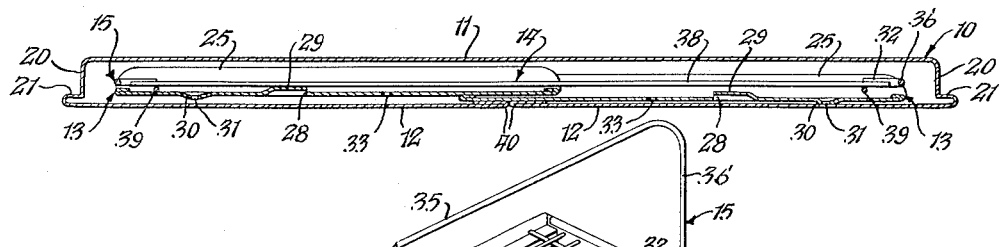
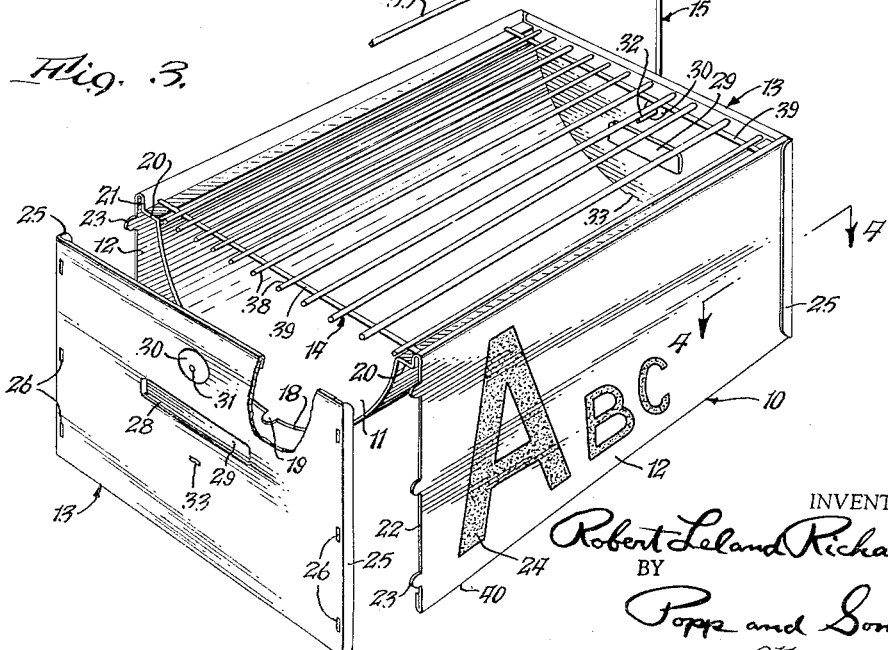
INVENTOR.
Robert Leland Richardson
BY
Popp and Sommer
Attorneys.

United States Patent Office 2,999,494
Patented Sept. 12, 1961

2,999,494
PICNIC GRILL
Robert Leland Richardson, Eden, N.Y., assignor to Eclipse Metal Mfg. Corp., Eden, N.Y., a corporation of New York
Filed Oct. 27, 1958, Ser. No. 769,655
3 Claims. (Cl. 126—25)

This invention relates to a picnic grill and is specially designed for the young fellow as a grill of his own for camping, hiking, or to do his own cooking in the back yard.

One of the principal objects of the present invention is to provide a clean, healthful and educational sport that will give real enjoyment and satisfaction at a minimum cost.

Another object is to provide such a low cost grill, which is both heat resistant and rust resistant.

Another object of the invention is to provide a fire pot which resists warping.

Another object is to provide such a grill having lithographed sheet metal sides in which the lithograph will not burn off due to an air space provided between the fire pot and these sides.

Another object is to provide such a grill which can be shipped flat, each grill in a cardboard sleeve.

Another object is to provide such a grill which requires very little storage space.

Another aim is to provide such a grill which is mailable from all post offices to all points.

Another object is to provide such a grill, which has a convenient carrying handle and can be used as a carrying case.

Another object is to provide such a grill, which can be set up in the order of one minute and can be restored to its collapsed condition a large number of times.

Another object is to provide such a grill in which adequate air is supplied for cooking and the ashes will not fall to the ground or other supporting surface, thereby to permit the use of the grill in boats or in other locations where falling hot ashes would be undesirable or dangerous.

Another object is to provide such a grill which provides an exceptionally great value for a very small cost and will appeal to all youth groups of both boys and girls.

Another object is to provide such a grill which is adapted to different sales promotions, such as coupon or box-top sales where the coupons or box tops are mailed with a small amount of money in order to obtain the grill.

Another object is to provide such a picnic grill, which has large side wall space available for advertising or other promotions.

Other objects and advantages of the invention will be apparent from the following description and drawings in which:

FIG. 1 is a perspective view of a picnic grill of the present invention shown in its folded or collapsed form, a part of the fire pot portion being broken away to show the manner in which the parts are nested.

FIG. 2 is an enlarged vertical section taken along line 2—2 FIG. 1.

FIG. 3 is a perspective view of the grill partly set up for use, one end wall being shown in an exploded or offset position preparatory to completing the setup grill, and certain parts being broken away.

FIG. 4 is an enlarged part of a fragmentary horizontal section taken on line 4—4 FIG. 3.

The grill embodying the present invention preferably consists of five separate parts, namely the sheet metal part or body sheet 10, which is opened up to provide the fire box 11 and side walls 12; a pair of identical sheet metal end walls 13 having bottoms adapted for steady support on the ground; a flat grid 14; and a bail or handle 15.

The sheet metal part or body sheet 10 is made of a single piece of light gage sheet metal, preferably steel for economy, with its surfaces having an aluminum coating material which is both heat-resistant and rust-resistant. In the folded condition of the grill, the fire pot 11 is in the form of a large rectangular area having its opposite generally parallel edges 18 centrally provided with an outwardly projecting tab 19. The other two edges of the fire pot area 11 are continued as perpendicular flanges 20, which extend in the same direction and which in turn have their opposite edges continued in the form of perpendicular flanges 21, which project outwardly. It will therefore be seen that each pair of flanges 20, 21 jointly provide an integral flange which is L-shaped in cross section and projecting from opposite edges of the fire pot 11, each pair of these flanges 20, 21 also forming the rims of a trough-shaped portion as hereinafter described.

The outer extremities of the flanges 21 are continued in the form of the side walls 12 each is of rectangular form and provided along each of its vertical edges 22 with a plurality of outwardly projecting tabs 23, three being shown. The side panels 12 are of the same size and their outer surface can be attractively lithographed to provide any desired ornamentation or advertising, a feature of the invention being that these side walls are spaced from the fire pot so that such lithography will not be burned off by the heat of the fire in the fire pot. Such lithographed design is indicated at 24.

Each end wall 13 is of rectangular form and is shown as having integral flanges 25 projecting in the same direction from its opposite vertical edges. The generally parallel edges 18 of the body sheet 10 engage the opposing faces of the end walls 13. Each end wall is also provided along each of its vertical edges with a plurality of slots 26 which are arranged to mate with the tabs 23 of the side walls 12. Each end wall is also provided with a horizontal louvered opening 28, the louver 29 for which is preferably offset to extend inwardly and downwardly. Above this louvered opening, each end wall is also provided with a box 30 provided with a central hole 31 adapted to receive the corresponding inwardly projecting end 32 of the wire handle or bail 15. Each end wall is also provided, below each louvered opening 28, with a horizontal slot 33 arranged to receive the corresponding tab 19 at the center of the fire pot. It is a feature of the invention that each of these slots 33 is arranged slightly higher than necessary so that in fitting the tabs 19, the center of the trough-shaped fire pot is distorted upwardly from the true semicylindrical shape, thereby to push the sides out and provide a more level bottom and wide fire.

The handle 15, as previously stated, is made of a single piece of wire, having a horizontal cross or handle part 35 and side legs 36 which terminate in the attaching ends 32, the latter being arranged in opposing relation to the other.

The horizontal grid 14 is composed of a series of closely spaced rods 38 welded to cross rods 39 to provide a structure which is generally rectangular in plan.

In its folded or collapsed condition, as illustrated in FIG. 1, the fire pot section is flat and rectangular and the flanges 20, 21 space the side walls 12 from the fire pot section 11, the latter having their bottom edges so arranged in opposed relation to the other. It will therefore be seen that this sheet metal structure provides a flat open-ended tube into which the grid 14, end walls 13 and handle 15 can be inserted. Accordingly, in the folded or collapsed state, as illustrated in FIG. 1, the grill can be readily stored and shipped, or mailed as an individual piece by providing a simple wrapper.

In setting up the grill for use, the end flange 25 of one end wall 13 is first fitted around the exterior of one of the side walls 12, at one vertical edge 22 thereof. The tabs 23 at this edge are then threaded through the corresponding slots 26. All three of these tabs are then bent over the end wall 13. In so fastening this end wall, one should make sure that the handle hole 31 is toward the top.

The side walls 12 are then spread and brought into parallel relation and the flange 25 at the opposite end of the fastened end panel 13 is then brought around the exterior of the opposite side wall 12 near the edge 22 thereof and the adjacent tabs 23 are passed through the corresponding slots 26. When so assembled, the side walls 12 form integral downward continuations of the rims 20, 21 of the now trough-shaped portion 11. Before these tabs are bent over, the tab 19 is raised and passed through the slot 33. As perviously indicated, the hole 33 is positioned about the natural position of the tab 19 so that the center of the now trough-like fire box 11 is pushed upwardly and maintained under stress by this tab 19. These tabs 19 and 23 are now bent over to complete the securement of this end wall.

The other end wall 13 is now secured to the opposite end of the fire pot 11 and its side walls 12 in like manner. The end legs 36 of the handle or bail 15 are now spread and their opposing ends 32 brought together through the holes 31.

The trough-shaped fire pot 11 can now be filled with fuel and ignited, the air for combustion being supplied through the air inlet openings 28. After the fire has been made, the grid 14 is placed upon the horizontal flanges 20 and it will be noted that this grid is held against lateral displacement by the upwardly extending flanges 20 as well as by the end walls 13. The food to be cooked can then be placed upon the grid.

It will be noted that in its setup form, the picnic grill comprises a pair of generally parallel sheet metal vertical end walls 13, a trough-shaped sheet metal fire pot 11 having generally parallel curving end edges 18 fitted against the opposing faces of the end walls 13, the fastening tabs 19 adjacent the center of each of the curved edges securing the fire pot to the end walls and that the remaining edges of the rectangular fire pot 11 are continued in the form of horizontal flanges 20 adapted to support the grid 14. It will also be seen that means are provided for fastening the opposite ends of these horizontal flanges 20 to the end walls 23 so as to maintain the fire pot 11 under stress, and that in the preferred form such fastening means comprises both the upwardly projecting flanges 21 and the downwardly extending side walls 12 with the latter provided with the tabs 23 extending through the end walls.

It will be further seen that the louvered openings 29 provide adequate air for combustion and that the holes 31 above these openings provide adequate support from the handle.

In actual practice, the tabs 23 can be bent back and forth as many as twenty-five times, so that the picnic grill can be set up and collapsed a great number of times. Since it is unlikely that a youngster would want to fold his grill after each use, it will be seen that the grill can be used repeatedly for a long time without breaking the tabs.

Because of its compact form and low cost and appeal to youngsters, it will be seen that it is adapted for the premium market, the more particularly in that it is easily mailed and that its side walls can be lithographed for either ornamention or advertising purposes or both. In this connection, it will be noted that since these side walls 12 are spaced from the fire pot 11, heat from the latter will not destroy the lithography. It will also be seen that in spite of its being made from low-cost sheet metal pieces, the picnic grill of the present invention not only has the appearance of being a very solid, rugged and sturdy picnic grill, but actually has these qualities.

I claim:

1. A light gage sheet metal fire pot for a picnic grill capable of being set up in the order of one minute and restored to a collapsed condition a large number of times, comprising, in its set up condition, a pair of generally parallel one piece sheet metal vertical end walls having bottoms adapted for steady support on the ground and a sheet metal body sheet having generally parallel edges engaging the opposing faces of said end walls, said metal body sheet having a horizontally elongated trough-shaped central portion and side walls each forming an integral downward continuation of each rim of said trough-shaped portion, a first integral tab and slot connection between the bottom of said trough-shaped portion and each end wall, a second integral tab and slot connection between said metal body sheet and each end wall adjacent the upper end of each side wall and forming with said first integral tab and slot connection the sole support for said trough-shaped portion, and a third integral tab and slot connection between each end wall and the lower end of each side wall, and, in the collapsed condition of the fire pot, said trough-shaped portion being in the form of a flattened metal sheet and said side walls being arranged in spaced parallel relation thereto with their bottom edges in opposing relation to each other, and said end walls being housed in the space between said flattened trough-shaped portion and said side walls.

2. A light gage sheet metal fire pot for a picnic grill capable of being set up in the order of one minute and restored to a collapsed condition a large number of times, comprising a pair of generally parallel one piece sheet metal vertical end walls having bottoms adapted for steady support on the ground and a sheet metal body sheet having generally parallel edges engaging the opposing faces of said end walls, said metal body sheet having a generally semicylindrical trough-shaped central portion and side walls each forming an integral downward continuation of each rim of said trough-shaped portion, a first integral tab projecting from each edge of said metal body sheet at the bottom of said trough-shaped portion into a companion slot in the corresponding end wall and being bent toward the outer face of the latter, a second integral tab projecting from each edge of said metal body sheet adjacent the upper end of each side wall into a slot in the corresponding end wall and being bent toward the outer face of the latter, said first and second integral tabs forming the sole support for said trough-shaped portion, and said companion slots containing said first tabs being at such high elevation as to hold said trough-shaped portion under stress with its bottom distorted upwardly from true semicylindrical shape, and a third integral tab projecting from each edge of said metal body sheet at the lower end of each side wall into a slot in the corresponding end wall and being bent toward the outer face of the latter.

3. A light gage sheet metal fire pot for a picnic grill capable of being set up in the order of one minute and restored to a collapsed condition a large number of times, comprising a pair of generally parallel one piece sheet metal vertical end walls having bottoms adapted for steady support on the ground and a sheet metal body sheet having generally parallel edges engaging the opposing faces of said end walls, said metal body sheet having a horizontally elongated trough-shaped central portion and side walls each forming an integral downward continuation of each rim of said trough-shaped portion, a first integral tab and slot connection between the bottom of said trough-shaped portion and each end wall, a second integral tab and slot connection between said metal body sheet and each end wall adjacent the upper end of each side wall and forming with said first integral tab and slot connection the sole support for said trough-shaped portion, and a third integral tab and slot connection between each end wall and the lower end of each side wall, each of said rims being provided with connected vertically depressed and elevated portions extending substantially the full length thereof, each elevated portion forming a continuation of the corresponding side wall and each depressed portion forming a lateral continuation of the trough-shaped portion to provide a depressed seat adapted to support the opposite edges of a grid.

References Cited in the file of this patent

UNITED STATES PATENTS

| | | | |
|---|---|---|---|
| 645,480 | Matthias | Mar. 13, | 1900 |
| 723,129 | Bondurant | Mar. 17, | 1903 |
| 1,298,762 | Milligan | Apr. 1, | 1919 |
| 1,564,276 | Robertson | Dec. 8, | 1925 |
| 2,080,109 | Brennan | May 11, | 1937 |
| 2,091,951 | Anthony | Sept. 7, | 1937 |
| 2,102,217 | Polhemus | Dec. 14, | 1937 |
| 2,236,992 | Broadley | Apr. 1, | 1941 |
| 2,334,847 | Spiers | Nov. 23, | 1943 |
| 2,488,014 | Higman | Nov. 15, | 1949 |
| 2,531,684 | Jackson | Nov. 28, | 1950 |
| 2,597,477 | Haislip | May 20, | 1952 |
| 2,842,116 | Hinderer | July 8, | 1958 |
| 2,848,149 | Ward | Aug. 19, | 1958 |
| 2,909,170 | Hathorn | Oct. 20, | 1959 |

FOREIGN PATENTS

| | | | |
|---|---|---|---|
| 864,422 | France | Jan. 17, | 1941 |